US012615004B2

(12) United States Patent
Wolpert

(10) Patent No.: US 12,615,004 B2
(45) Date of Patent: Apr. 28, 2026

(54) MOUNTING DEVICE FOR A SOLAR SYSTEM AND METHOD FOR MOUNTING A SOLAR SYSTEM

(71) Applicant: C.W.F. GmbH, Niedernhall (DE)

(72) Inventor: Sandra Wolpert, Niedernhall (DE)

(73) Assignee: C.W.F. GmbH, Niedernhall (DE)

( * ) Notice: Subject to any disclaimer, the term of this patent is extended or adjusted under 35 U.S.C. 154(b) by 18 days.

(21) Appl. No.: 18/726,177

(22) PCT Filed: Aug. 29, 2022

(86) PCT No.: PCT/EP2022/073962
§ 371 (c)(1),
(2) Date: Jul. 2, 2024

(87) PCT Pub. No.: WO2024/046541
PCT Pub. Date: Mar. 7, 2024

(65) Prior Publication Data
US 2025/0158557 A1     May 15, 2025

(51) Int. Cl.
*H02S 20/10* (2014.01)
*F16B 9/00* (2006.01)
*F16B 9/02* (2006.01)

(52) U.S. Cl.
CPC ................ *H02S 20/10* (2014.12); *F16B 9/02* (2013.01); *F16B 9/05* (2018.08)

(58) Field of Classification Search
CPC .. H02S 20/10; H02S 20/30; F16B 9/02; F16B 9/05; F24S 25/12; F24S 25/632; F24S 25/65; F24S 25/70
See application file for complete search history.

(56) References Cited

U.S. PATENT DOCUMENTS 2,761,643 A * 9/1956 Ward ....................... H02K 5/00
                                                248/230.1
4,245,895 A * 1/1981 Wildenrotter ........... H02S 20/30
                                                136/246

(Continued)

FOREIGN PATENT DOCUMENTS

DE      102016015436 A1    6/2018
DE      102021119760 A1    2/2022

(Continued)

OTHER PUBLICATIONS

CWF GmbH Niedernhall, Facebook, Apr. 28, 2022, retrieved from https://www.facebook.com/102978058263016/photos/a.103099184917570/453635196530632/?locale=deDE on Jul. 17, 2024.

(Continued)

*Primary Examiner* — Ko H Chan
(74) *Attorney, Agent, or Firm* — The Webb Law Firm

(57) ABSTRACT

A mounting device for a solar system which includes a plurality of support posts which in pairs define a receiving zone for a solar panel. The solar panel is attached to each of the two support posts by means of at least one panel mounting device, which has a base element attached to the support post and a panel support element attached to the solar panel. To enable a panel in-use position of the solar panel to be set, both the base element with respect to the support post and the panel retaining element with respect to the base element can be adjusted for each panel mounting device.

21 Claims, 5 Drawing Sheets

(56) References Cited

U.S. PATENT DOCUMENTS

| | | | | |
|---|---|---|---|---|
| 4,265,422 | A * | 5/1981 | Van Leeuwen | F24S 25/10 136/244 |
| 4,309,857 | A * | 1/1982 | Lovering | E04G 11/56 52/632 |
| 5,228,924 | A * | 7/1993 | Barker | H02S 20/30 136/246 |
| 5,232,518 | A * | 8/1993 | Nath | E04D 3/366 52/509 |
| 11,411,525 | B2 | 8/2022 | Hildebrandt et al. | |
| 2003/0029362 | A1 * | 2/2003 | Ondrasik | A47B 57/20 108/110 |
| 2009/0256046 | A1 * | 10/2009 | Hausner | F24S 25/70 248/398 |
| 2015/0207452 | A1 * | 7/2015 | Werner | F24S 50/20 136/246 |
| 2016/0141437 | A1 * | 5/2016 | Asbeck | H02S 40/22 136/246 |
| 2018/0320382 | A1 * | 11/2018 | De Ridder | H02S 20/10 |
| 2020/0153380 | A1 * | 5/2020 | Hildebrandt | F16B 9/05 |
| 2024/0380362 | A1 * | 11/2024 | Perret | F24S 25/617 |
| 2025/0112586 | A1 * | 4/2025 | Finarov | F24S 30/42 |

FOREIGN PATENT DOCUMENTS

| | | | | |
|---|---|---|---|---|
| WO | 2011066913 | A2 | 6/2011 | |
| WO | WO-2024046541 | A1 * | 3/2024 | .............. F16B 9/02 |

OTHER PUBLICATIONS

CWF GmbH Niedernhall, Facebook, Apr. 29, 2022, retrieved from https://www.facebook.com/photo/?fbid=453971973163621&set=a. 103099184917570&locale=deDE on Jul. 17, 2024.

CWF GmbH Niedernhall, Facebook, May 11, 2022, retrieved from https://www.facebook.com/102978058263016/photos/a. 135140938380061/461947652366053/?locale=deDE on Jul. 17, 2024.

CWF GmbH Niedernhall, Facebook, May 25, 2022, retrieved from https://www.facebook.com/people/CWF-GmbH-Niedernhall/ 100021212833971/?locale=de_DE.

CWF GmbH Niedernhall, Facebook, May 25, 2022, retrieved from https://www.facebook.com/photo/?fbid=471258688101616&set= pcb.471261711434647&locale-de_DE on Apr. 24, 2023.

CWF GmbH Niedernhall, Facebook, May 25, 2022, retrieved from https://www.facebook.com/photo/?fbid=471258854768266&set= pcb.471261711434647&locale=de_DE on Apr. 24, 2023.

* cited by examiner

MOUNTING DEVICE FOR A SOLAR SYSTEM AND METHOD FOR MOUNTING A SOLAR SYSTEM

CROSS-REFERENCE TO RELATED APPLICATION

This application is the United States national phase of International Patent Application No. PCT/EP2022/073962 filed Aug. 29, 2022, the disclosure of which is hereby incorporated by reference in its entirety.

BACKGROUND

Field

The invention relates to a mounting device for a solar system, having a plurality of support posts each extending in a post longitudinal direction, which support posts are arranged at a distance from one another in a post in-use position with the post longitudinal direction in each case aligned at least substantially vertically in a post row direction orthogonal to the post longitudinal direction, wherein at least two support posts neighbouring one another in the post row direction form a support post pair, the support posts of which laterally define a receiving zone for at least one panel-shaped solar panel of the solar system which occupies a post in-use position and which, in the post in-use position, is fastened by means of a holding device of the mounting device to the two support posts of the support post pair occupying the post in-use position.

The invention also relates to a method for mounting a solar system by means of a mounting device.

Description of Related Art

In view of the efficient utilisation of solar energy to generate electricity, the installation of solar systems on agricultural land is increasingly being discussed and has already been implemented in practice. The "Rack system" product sheet from Next2Sun GmbH, Trierer Str. 22, 66663 Merzig, Germany, describes a solar system designed as an outdoor system that is suitable for the vertical installation of frameless photovoltaic panels. In particular, the photovoltaic panels are of a bifacial type, i.e. they are photoelectrically active on both sides. The rack system contains a plurality of support posts, which are fixed in a row of posts in a vertical longitudinal alignment in an open-air ground, with neighbouring support posts in the post row direction defining a receiving zone in which two solar panels are arranged one above the other. The solar panels are attached to the respective assigned support post pair by means of a frame-shaped structured holding device.

WO 2011/066913 A2 discloses a mounting arrangement for a solar installation comprising a plurality of support posts, at the upper end region of which a cross-member is mounted by means of two cross-member holders, to which a solar panel inclined with respect to the horizontal can be attached. The two cross-member holders can be adjusted in the longitudinal direction of the associated support post and in this way allow flexible adjustment of a desired panel in-use position for the solar panel.

SUMMARY

The invention is based on the problem of providing a mounting device for a solar system which comprises a structurally simple design, can be manufactured cost-effectively and can be installed on site in a time-saving manner. Furthermore, an installation method is proposed with which a solar system can be installed efficiently and precisely in the field using the mounting device.

The problem is solved in a mounting device of the type mentioned at the beginning, in that the holding device has a plurality of panel mounting devices which are formed separately from one another, wherein the at least one solar panel occupying the panel in-use position is attached to each of the two support posts of the associated support post pair via at least one of the plurality of panel mounting devices, wherein each panel mounting device has a base element which can be fastened or is fastened to the support post assigned to it and a panel support element which is separate with respect to the base element and can be fastened or is fastened to the solar panel on the one hand and to the base element on the other hand, wherein, in order to enable the panel in-use position of the solar panel to be adjusted, both the base element can be adjusted relative to the support post assigned to it and the panel support element can be adjusted relative to the base element assigned to it in the case of each panel mounting device.

The mounting device according to the invention comprises a plurality of at least two and in particular more than two support posts, each of which extends along a post longitudinal direction and which, when used as intended, assume a post in-use position in which their post longitudinal direction is orientated at least substantially vertically. The plurality of support posts are lined up in a post row direction with mutual spacing, wherein the post row direction extends orthogonally to the post longitudinal direction. Directly neighbouring support posts each jointly define a receiving zone for a panel-shaped solar panel and are referred to as a support post pair for better distinction. Depending on the number and arrangement of the support posts, the mounting device can comprise one or more support post pairs for defining one or more receiving zones for at least one solar panel. Each solar panel present is attached to a support post pair by means of a holding device comprising several panel mounting devices that are designed separately from one another, i.e. several individual panel mounting devices. The several panel mounting devices can be handled independently of each other before and during their intended installation. Each solar panel carried by a support post pair is mounted on each of the two associated support posts via at least one of the panel mounting devices. Depending in particular on its size, a solar panel can be fixed to each support post by means of only a single panel mounting device or by means of several panel mounting devices spaced apart in the post longitudinal direction. Each panel mounting device establishes a connection between the solar panel and only one of the two neighbouring support posts. Apart from the panel mounting devices, there are expediently no fastening measures for the solar panel in relation to the support posts. The panel mounting devices have an advantageous multi-part structure and comprise two main components, a base element and a separate panel support element. When installed as intended, each panel mounting device is attached to a support post via the base element and to the solar panel to be installed via the panel support element. Since the panel mounting devices are only present at certain points and in particular are only assigned to the edge areas of the solar panels orientated in the post row direction, shading effects of the holding device on the respectively assigned solar panel can be kept to a minimum or even completely ruled out. The division into two separate elements of a respective panel mounting device makes it possible, in particular, to mount a solar panel by attaching the base elements to the support posts independently of the panel support elements and the panel support elements to the solar panel independently of the base elements and only then to fix the solar panel, which is combined with the panel support elements to form a panel mounting unit, to the support posts by attaching the panel support elements and the base elements to each other in pairs in the correct order. However, even when the solar panels are mounted by means of panel mounting devices, the base element and panel support element of which are already combined in advance to form an assembly, the mounting device offers the advantageous possibility of adjusting both each base element relative to the support post fitted with it and each panel support element relative to the associated base element in order to variably set the panel in-use position desired for the solar panel in question. The adjustability of the base elements and the panel support elements for each panel mounting device, which is ensured in particular independently of one another, makes it possible to compensate for installation tolerances that inevitably occur during the intended installation of the support posts in the open air and to position each solar panel in the desired panel in-use position, in particular also independently of any other solar panels that may be present. Thus, in particular, a requirement can be created to install a large number of solar panels and, in particular, all solar panels arranged in a common row with the same spatial orientation and/or adaptation to the terrain profiling, which enables a uniform solar yield and causes the least possible interference with parallel agricultural use of neighbouring free areas. A panel in-use position with vertical solar panel alignment is preferred, in which the panel plane of the solar panel courses vertically or the normal vector of the panel plane is aligned horizontally.

The above problem is also solved by a particular method which provides for the assembly of a solar system by means of a mounting device of the type explained above. Such a method according to the invention comprises the following steps:

(a) installation of a plurality of support posts on or in an open-air ground in such a way that the support posts are arranged at a distance from one another in a post row direction and their post longitudinal direction is at least substantially vertical in each case, so that neighbouring support posts in the post row direction each form a support post pair which defines a receiving zone for a solar panel to be mounted in a panel in-use position, (b) attachment of the base elements of the panel mounting devices used to hold at least one solar panel to the two support posts of at least one of the installed support post pairs in a state separate from the respective associated panel support element, (c) attachment of the panel support elements of the panel mounting devices used to hold a solar panel in a state separate from the respective base element to at least one solar panel to be mounted on a support post pair, forming a panel mounting unit, (d) Attachment of the panel mounting unit with its panel support elements to the base elements previously attached to a support post pair, (e) Setting the desired panel in-use position for the solar panel by aligning the individual base elements with respect to the support posts fitted with them before and/or after attachment of the panel mounting unit and by aligning the panel support elements attached to the solar panel with respect to the base element assigned to them in each case.

As there is a double adjustment option for each panel mounting device, there are sufficient degrees of freedom of adjustment available to optimally position the solar panel in the desired panel in-use position. To mount a solar panel, the base elements are attached to the support posts independently of the panel support elements and the panel support elements are attached to the solar panel independently of the base elements. The solar panel and the panel support elements attached to it form a uniformly manageable panel mounting unit that can be attached with its panel support elements to the base elements pre-mounted on the support posts in a time-saving manner.

Advantageous further embodiments of the invention are shown in the subclaims.

The mounting device is suitable for use with any type of solar panel and, for example, also in connection with solar thermal modules. However, a design in connection with photovoltaic panels is particularly advantageous, preferably photovoltaic panels that are photoelectrically active on both sides, i.e. so-called bifacial photovoltaic panels.

In its panel in-use position, the at least one panel-shaped solar panel is aligned in particular in such a way that at least one flat panel surface area of the solar panel that is receptive to solar energy input extends vertically. The normal vector of said panel surface area is then orientated horizontally. In the following, this is referred to as vertical panel orientation. The solar panel may have only a single or even two opposing flat panel surface areas that are susceptible to solar energy input.

The at least one solar panel has two opposing lateral margin sections which, in the panel in-use position, each face one of the two support posts of the associated support post pair in the post row direction. Expediently, each panel mounting device is attached to the solar panel with its panel mounting section in the area of one of these lateral margin sections, so that it extends between this lateral margin section and the neighbouring support post. In this way, shading of the panel surface area susceptible to solar energy input by the panel mounting devices can be avoided. In particular, no components of the holding device used to fix the solar panel are provided on a margin section pointing upwards in the post longitudinal direction.

Preferably, the holding device provides an adjustment option for the solar panel such that, on the one hand, the base element of each panel mounting device can be adjusted relative to the associated support post in an adjustment plane orthogonal to the post row direction and, on the other hand, each panel support element can be adjusted relative to the associated base element in the post row direction. Among other things, the latter also offers the advantageous possibility of aligning the solar panel in the centre between the support posts of the assigned support post pair if required.

It is favourable if the base element can be displaced in all directions relative to the associated support post in the aforementioned adjustment plane in order to set the panel in-use position of the at least one solar panel for each panel mounting device, so that both a vertical position and a horizontal position of the base element orthogonal thereto can be set. Preferably, the base element can also be rotated in the adjustment plane in order to be able to change the inclination and accordingly position the solar panel in a desired angular orientation. The adjustment options are preferably designed in such a way that the individual displacement and rotating options can be carried out both individually and superimposed. In particular, rotating is possible around an imaginary axis of rotation that extends in the post row direction.

It is also advantageous if, in order to adjust the panel in-use position of a respective solar panel, the panel support element can be linearly displaced relative to the associated base element in the post row direction for each associated panel mounting device. Due to this functionality, the panel support element can also be referred to as a slider.

Expediently, the base element of each panel mounting device, which is attached to a support post, is positioned against a mounting surface area of the relevant support post that faces the other support post of the same support post pair in the post row direction.

Preferably, a first fastening device, a second fastening device and a third fastening device are assigned to each panel mounting device. The first fastening device is designed to fasten the base element to a support post, the second fastening device is designed to fasten the panel support element to the base element and the third fastening device is designed to fasten the panel support element to the solar panel to be fixed. Preferably, each of the three fastening devices is designed as a detachable fastening device, for example using screw connections, so that any necessary readjustments can be made very easily at any time.

Each support post of the mounting device has a longitudinal shape with a longitudinal post axis defining a post longitudinal direction. In the post in-use position, the post longitudinal direction extends as far as possible and at least substantially vertically. Furthermore, each support post has a post width direction which, in the post in-use position, coincides with the post row direction and is accordingly orthogonal to the post longitudinal direction. In addition, each support post extends in a direction orthogonal to the post longitudinal direction and the post width direction, which is referred to as the "post depth direction". In particular, the post depth direction extends parallel to the adjustment plane of the base elements mentioned above.

The first fastening device expediently has a plurality of oblong holes formed in the associated support post at a distance from one another in the post longitudinal direction, which are referred to as post oblong holes and which each extend in the post depth direction. In addition, the first fastening device has two oblong holes formed in the base element, referred to as base oblong holes for better differentiation, which each extend in the post longitudinal direction and which are formed in the base element at a distance from one another in the post longitudinal direction. Finally, the first fastening device also comprises two clamping units, which can assume both an unclamped state of use, which allows the base element to be adjusted in relation to the support post, and a clamped state of use, which blocks the base element immovably in relation to the support post. The respective state of use can be preset manually, in particular using a suitable actuating tool. The base element is arranged such that its two base oblong holes are each arranged in a cross-over configuration with one of the post oblong holes, with each of the two clamping units passing through both one of the base oblong holes and the post oblong hole arranged in cross-over configuration in this respect. In the case of unclamped clamping units, the cross-over oblong holes offer the above-mentioned possibility of performing a stepless relative adjustment movement of the base element with respect to the support post, performing a translational and/or a rotational respectively swivelling movement.

It is advantageous if at least one oblong hole array is formed in each support post, which is composed of a plurality of post oblong holes having more than two post oblong holes, which are arranged at the same distance from one another in the post longitudinal direction. With the participation of this oblong hole array, the associated panel mounting device with its base element can be fastened in stages in different vertical positions and correspondingly at different heights above a ground to or in which the support posts are anchored. Different stepwise vertical positions are characterised by the fact that different post oblong holes are involved in the crossover configuration with the base oblong holes. Fine adjustment of the vertical position is possible using the stepless adjustment movement, which changes the relative position between the oblong holes arranged in a cross-over configuration.

Each support post can be equipped with a single oblong hole array for fastening a solar panel, which is used or can be used by only one panel mounting device or by several panel mounting devices. Alternatively, several oblong hole arrays arranged at a distance from each other in the post longitudinal direction can be formed in the support post for simultaneous use by several panel mounting devices.

In a preferred embodiment, each support post has a U-shaped cross-sectional profile with two post legs which are opposite each other at a distance in the post row direction and which each extend in a plane orthogonal to the post row direction coinciding with the post width direction. Expediently, several of the post oblong holes are formed in each of the two post legs, so that each post leg can be used to attach one of two solar panels placed in neighbouring receiving zones to one and the same support post.

The second fastening device preferably contains an oblong hole formed in the panel support element, which extends in the post row direction and is referred to as the panel support element oblong hole for better differentiation. It is associated with a fastening hole formed in the base element and also belonging to the second fastening device, which is referred to as the base element mounting hole for better differentiation and is covered by the panel support element oblong hole. The base element mounting hole is in particular a circular through hole. In particular, the second fastening device also contains a clamping unit which passes through both the panel support oblong hole and the base element mounting hole, which is aligned with respect thereto, and which can optionally be set to an unclamped or clamped state of use, analogous to the clamping units mentioned above, in order either to enable the panel support element to be adjusted with respect to the base element or to block these two components relative to one another so that they cannot be moved.

It is favourable if the third fastening device has a fastening hole formed in the panel support element, referred to as the support element mounting hole for better differentiation, with which a further fastening hole, referred to as the solar panel mounting hole, is aligned, which is formed in the solar panel. Expediently, the solar panel mounting hole is located in a panel frame defining the outside of the solar panel. A clamping unit, which also belongs to the third fastening device, passes jointly through the support element mounting hole and the solar panel mounting hole and enables the solar panel or its panel frame to be clamped immovably to the panel support element in a clamped state of use.

The various clamping units can be of different types. For example, they can be toggle lever clamping units or bayonet clamping units. Preferably, however, each clamping unit is designed as a clamping screw unit comprising a clamping screw that can be actuated by means of a suitable screwing tool.

A particularly high stability of the panel mounting device can be achieved if, in a preferred manner, the base element of each panel mounting device comprises a support section which, when mounted on a support post, has a support surface area pointing vertically upwards, on which the associated panel support element with a rest section can be placed vertically from above during its attachment and rests in the mounted state. To adjust the panel in-use position, it is possible in particular to move the panel support element back and forth along the support surface area in the post row direction in the manner of a slider when it is resting on the support surface. In particular, the support surface area can be used to provide linear guidance for an adjustment movement of the panel support element.

Expediently, the support surface areas of the base elements enable a previously assembled panel mounting unit with holding elements pre-mounted on the solar panel to be placed as a whole and then adjusted when mounting a solar system.

The aforementioned assembly of a panel mounting unit is favoured if the support section of each panel mounting device defines an upwardly open support flute extending in the post row direction, the flute surface of which forms the support surface area and into which the associated panel support element can be suspended with its rest section and is suspended when the panel mounting unit is mounted.

When using the method according to the invention, it is advantageously possible in this context to suspend the panel mounting unit for attachment to the base elements attached to the support posts with all its panel support elements, in particular simultaneously in the associated base elements. Hanging in this way results in a positive-locking pre-fixing horizontally transverse to the post row direction, which prevents it from falling down, with the possibility of simple adjustment in the post row direction until an immovable fixation has subsequently been achieved.

Particularly if the panel surface area of a solar panel is small, it may be sufficient to attach a solar panel to each of the two support posts of the assigned support post pair with only a single panel mounting device. For example, several smaller solar panels can be arranged consecutively in the post longitudinal direction, i.e. one above the other, placed in the same receiving zone and attached to the support posts of the same support post pair.

In order to ensure secure fastening even with higher wind forces, it is expedient if the solar panel assuming the panel in-use position is fastened to each of the two support posts of the associated support post pair via several mounting devices arranged at a distance from each other in the post longitudinal direction, regardless of its size. In particular, two panel mounting devices are provided per support post. Each panel mounting device provides a point suspension of the solar panel, so that a four-point suspension results when four panel mounting devices are used.

A mounting device designed to support a large number of solar panels can in principle comprise two separate support posts to form each pair of support posts defining a receiving zone. However, a much more cost-effective solution is a preferred structure in which there are several support post pairs each defining a receiving zone, whereby each support post flanked by a support post on opposite sides in the post row direction simultaneously belongs to two support post pairs and, with each of the two support posts flanking it, forms one of two support post pairs each defining a receiving zone for a solar panel. In this case, the mounting device is a row of posts composed of a plurality of support posts, in which only the support posts arranged at the two ends of the row, which can be designated as end posts, define only one receiving zone, while all the support posts arranged in between, which can be designated as intermediate posts, simultaneously define two neighbouring receiving zones for at least one solar panel in each case.

Support posts serving to define two receiving zones at the same time are expediently fitable or fitted with at least one separate panel mounting device for each neighbouring solar panel.

The panel mounting devices can be designed identically to each other for a particularly cost-effective structure. However, optimum adaptation to the conditions is achieved if the panel mounting devices arranged on the two support posts of a support post pair have a mirror-image structure, in particular mirror-symmetrical to a symmetry plane orthogonal to the post row direction.

A high level of stability, combined with rationalised production, is achieved if the base element and/or the panel support element of each panel mounting device is designed as a one-piece bent metal part. Preferably, these are galvanised sheet steel parts. The perforations in the aforementioned elements used for fastening are expediently made by punching or another hole-cutting process prior to bending.

Like the base elements and the panel support elements, the support posts are expediently designed in one piece. In particular, they are made of galvanised steel.

When using the method according to the invention, it is advantageous if the individual base elements are individually aligned independently of one another with respect to the support posts fitted with them and if the panel support elements are uniformly aligned with respect to the base elements of all associated panel mounting devices by changing the position of the panel mounting unit.

As already mentioned, it is advantageous if the panel mounting unit for attachment to the base elements already attached to the support posts is hooked into the base elements with all of its panel support elements, in particular simultaneously in a uniform hooking process.

BRIEF DESCRIPTION OF THE DRAWINGS

The terms Fig., Figs., Figure, and Figures are used interchangeably in the specification to refer to the corresponding figures in the drawings.

The invention is explained in more detail below with reference to the enclosed drawing. This shows.

DETAILED DESCRIPTION OF PREFERRED EMBODIMENTS

Figures 1, 2:
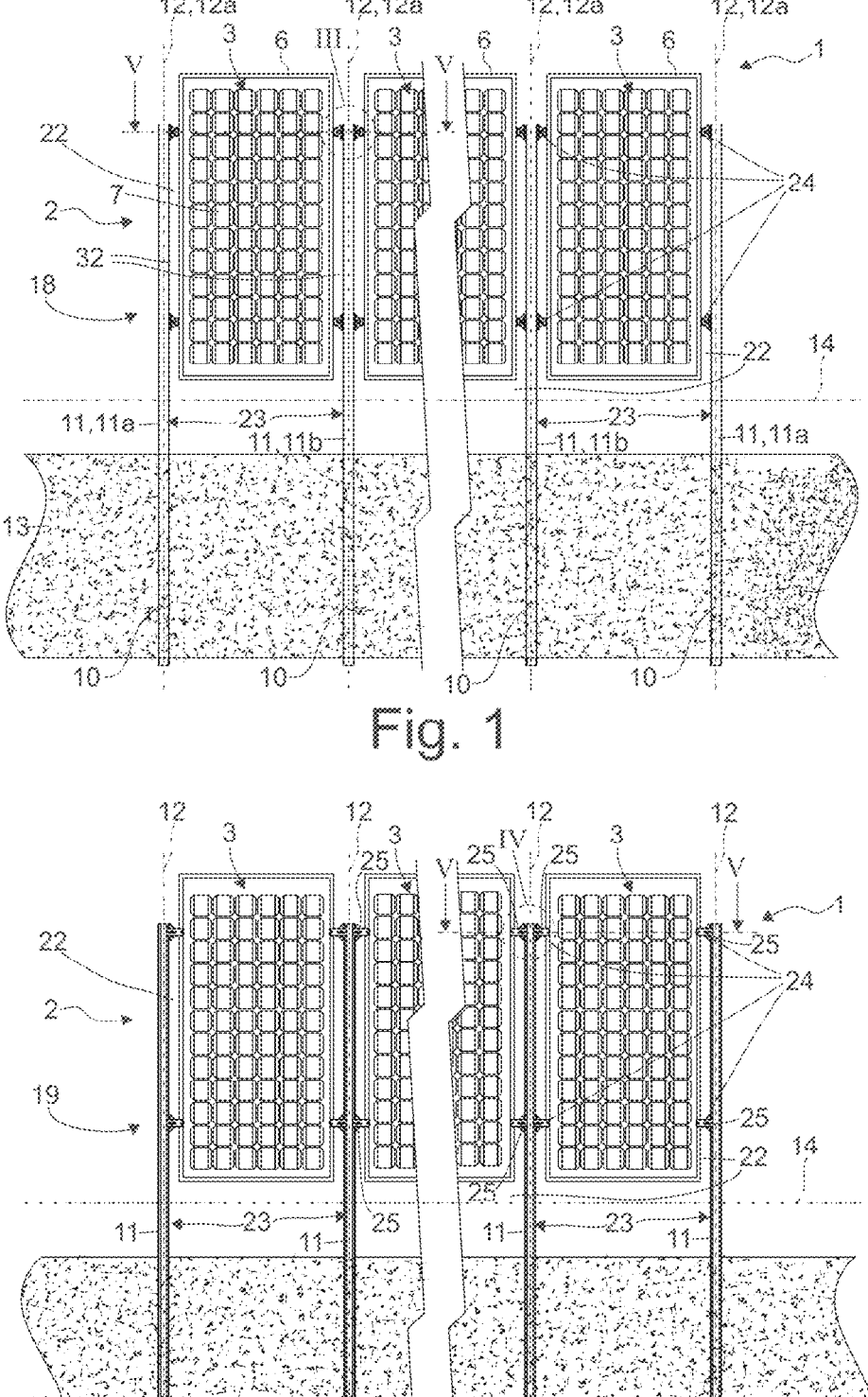
FIG. 1 a solar system of preferred construction formed using a mounting device according to the invention and comprising a plurality of solar panels in a ready-to-use operating state erected as intended on a ground in the open air in a front view with a view of panel surface areas of the individual solar panels pointing forwards, wherein the ground is illustrated in section and wherein the peripheral equipment required for operation, in particular of an electrical nature, is not shown, FIG. 2 a rear view of the arrangement shown in FIG. 1, FIG. 3 the detail III framed by a dotted line in FIG. 1 in an enlarged view, FIG. 4 the detail IV framed with a dotted line in FIG. 2 in an enlarged view, whereby the same image detail is shown as in FIG. 3, viewed from the opposite direction, FIG. 5 a horizontal longitudinal section of the arrangement shown in FIGS. 1 and 2 along the section line V-V as seen from above, FIG. 6 the detail VI framed by a dotted line in FIG. 5 in an enlarged view, FIG. 7 a single representation of one of the multiple support posts used in the arrangement according to FIGS. 1 to 6, looking towards one of the two mounting surface areas pointing horizontally in a post row direction, with two panel mounting devices attached to the support post at different heights being indicated by dotted lines, FIG. 8 in a section according to sectional plane VII-VII from FIG. 6, the detail VIII at the upper end region of the support post, framed in dotted lines in FIG. 7, in enlarged representation and with arrow illustrations to clarify the adjustment possibilities of the base element with respect to the support post, the illustration also applying correspondingly to the panel mounting device indicated in the lower region of FIG. 7, FIG. 9 an isometric representation of a preferred embodiment of a panel support element, and FIG. 10 a panel mounting unit manufactured in the method according to the invention from a solar panel and several panel support elements mounted thereon, the attachment of which to support sections indicated only schematically by dotted lines is indicated by arrows.
Figures 3, 4:
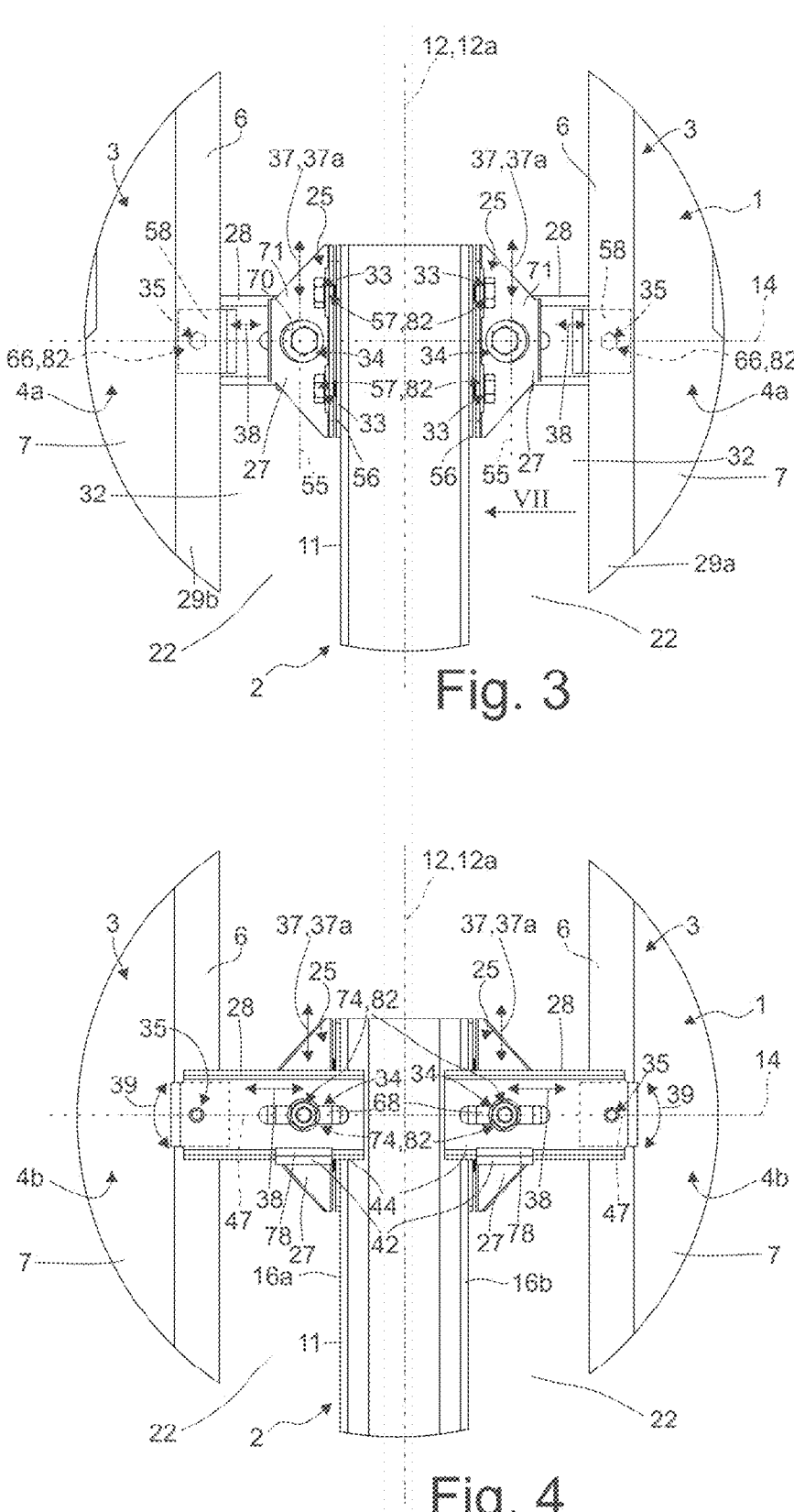
Figures 5, 6:
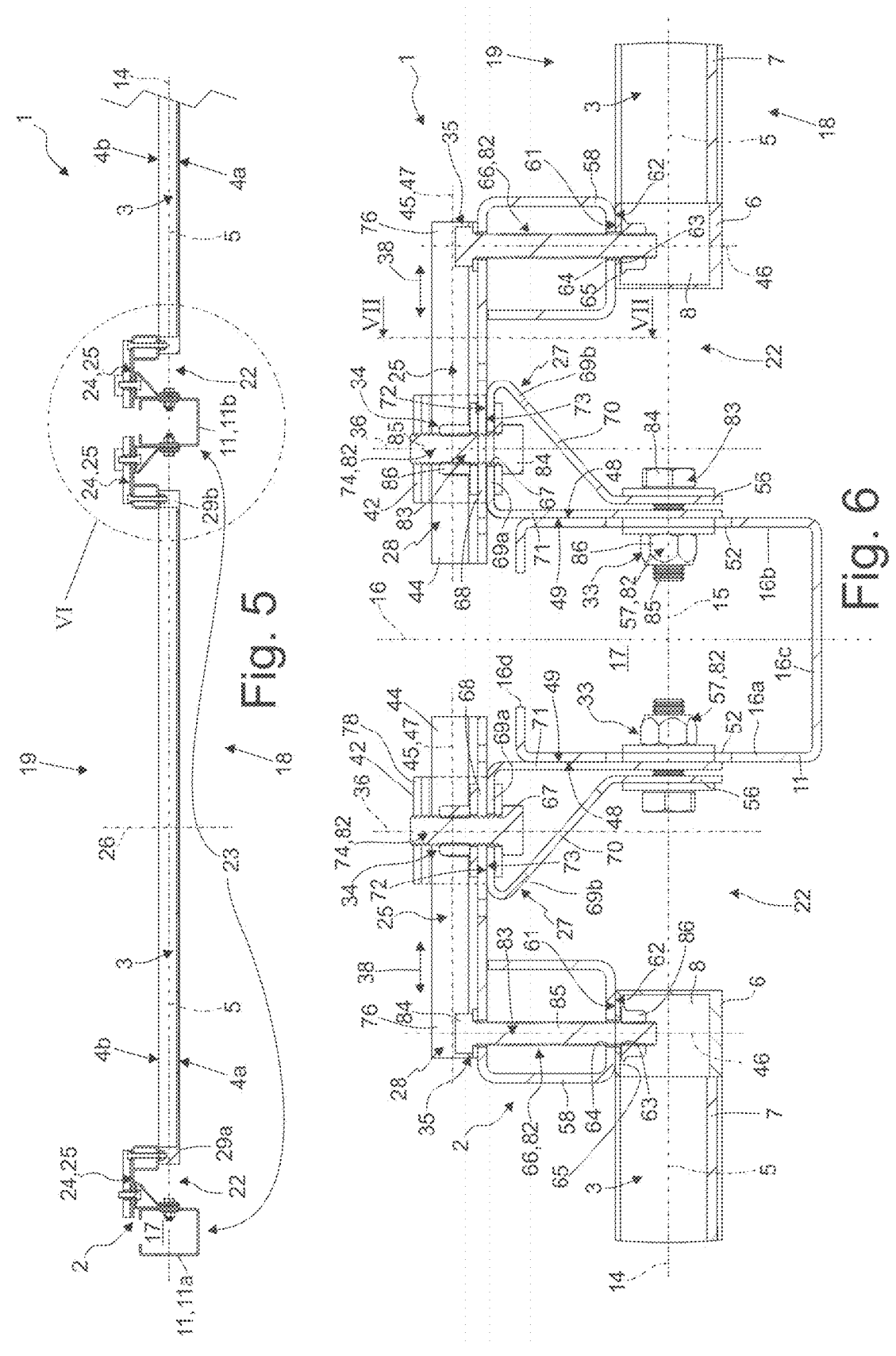

The drawing shows a solar system 1, also of preferred construction, constructed by means of a mounting device 2 of preferred construction according to the invention, which comprises a plurality of panel-shaped solar panels 3, each of which is held by means of the mounting device 2 in a panel in-use position.

A typical ready-to-use operating state of the mounting device 2 and the associated solar system 1 is illustrated, to which the following explanations refer in each case, unless otherwise specified in individual cases.

The solar panels 3 are panel-shaped and in particular have a rectangular outline. By way of example, the solar panels 3 are photovoltaic panels.

Each solar panel 3 has two opposing large-area, at least substantially flat first and second panel surface areas 4a, 4b. As an example, both panel surface areas 4a, 4b are photo-electrically active and equipped with solar cells that generate electricity when exposed to sunlight. These are therefore so-called bifacial photovoltaic panels. Deviating from this, however, the solar panels could also only be photoelectrically active on one side, i.e. on one of their two panel surface areas 4a, 4b.

Each solar panel 3 has a panel frame 6, in particular made of metal, running all the way round as an edge closure. In a frame window enclosed by the panel frame 6, there extends a panel-shaped panel element 7 having the two flat panel surface areas 4a, 4b, which has the above-mentioned photoelectric properties and which is exemplarily much thinner than the panel frame 6. The panel element 7 is attached to the panel frame 6 in a manner not shown further. The panel frame 6 is preferably profiled in a U-shape and defines a frame interior space 8, which is open inwards towards the frame window and thus towards the panel element 7. Due to the relatively low thickness of the panel element 7, the frame interior space 8 is easily accessible from the frame window.

Each of the plurality of solar panels 3 is orientated in its preferred panel in-use position, as shown in the drawing, such that the two flat panel surface areas 4a, 4b each extend vertically. In other words, the normal vectors of the flat panel surface areas 4a, 4b are orientated horizontally in the preferred panel in-use position. For simplicity, this orientation is referred to below as vertical panel orientation.

The mounting device 2 has a plurality of support posts 11, which are expediently identical to one another. Each support post 11 has a preferably linear longitudinal extension along a longitudinal axis 12a, the axial direction of which defines a post longitudinal direction 12.

In the ready-for-use operating state of the mounting device 2, each support post 11 has a post-in-use position as shown in the drawing, in which the post longitudinal direction 12 is aligned at least substantially vertically, the aim being to achieve an exactly vertical alignment.

The support posts 11 are stably attached with a lower end section 10 to or in a ground 13 located in the open. The ground 13 is in particular the ground, preferably the ground of an agriculturally usable or utilised area.

When installed in the post-in-use position, the support posts 11 are expediently driven into the ground 13 with their lower end section 10 to a predetermined driving depth using a suitable pile-driving device. This type of installation inevitably results in slight tolerance-related deviations in the post alignment with regard to the vertical direction.

The support posts 11 will be or are arranged consecutively at a distance from one another in such a way that a linear row of posts is formed. All support posts 11 are arranged at a distance from one another in a post row direction 14 orthogonal to the post longitudinal direction 12 and illustrated by a dotted line, whereby the distances between directly successive support posts 11 are expediently the same size.

In cross-section at right angles to the post longitudinal direction 12, each support post 11 extends in a post width direction 15 and in a post depth direction 16 orthogonal thereto. Both directions 15, 16 are illustrated in the drawing by dotted lines.

Preferably, each support post 11 has a U-shaped cross-sectional profile. In this respect, each support post 11 has two post legs 16a, 16b opposite each other in the post width direction 15 and a transverse post crossbar 16c connecting the two post legs 16a, 16b at one end. The support post 11 encloses a post interior space 17, which is accessible from the outside through a slot-shaped post opening 16d located opposite the post crossbar 16c in the post depth direction 16 and extending in the post longitudinal direction 12. The post opening 16d is defined by the end regions of the two post legs 16a, 16b opposite the post crossbar 16c, which are expediently bent round towards each other in order to achieve greater structural rigidity.

In the post in-use position, the support posts 11 are aligned such that the post width direction 15 coincides with the post row direction 14, with the two post legs 16a, 16b each extending in a plane orthogonal to the post row direction 14. The post crossbars 16c of all support posts 11 face horizontally towards a front 18 of the mounting device 2, all post openings 16d face towards a back 19 of the mounting device 2.

With their longitudinal sections arranged outside and above the ground 13, support posts 11 arranged in direct succession in the post longitudinal direction 12 each define a receiving zone 22 for a solar panel 3 arranged in the panel in-use position. For further reference, the two support posts 11 jointly defining a receiving zone 22 are each designated as a support post pair 23. The number of support post pairs 23 thus corresponds to the number of receiving zones 22 in each of which at least one solar panel 3 occupying its panel in-use position is arranged.

By way of example, a single solar panel 3 is positioned in each receiving zone 22, the further description being based on such an embodiment. It is understood that several solar panels 3, which then comprise a correspondingly smaller panel surface area 4a, 4b, can easily be arranged one above the other in at least one receiving zone 22 in the post longitudinal direction 12.

The panel planes 5 of the solar panels 3 placed in the receiving zones 22 extend parallel to the post row direction 14.

Each solar panel 3 arranged in a receiving zone 22 is attached to the two support posts 11 of the associated support post pair 23 by means of a holding device 24.

The support posts 11 arranged consecutively in the post row direction 14 together form a post row. Each support post 11 arranged between the two end support posts 11 of the row of posts, also referred to as end post 11a, forms a support post, also referred to below as intermediate post 11b, which belongs to two neighbouring support post pairs 23. Accordingly, the mounting device 2 defines two end receiving zones 22, each defined by an end post 11a and the neighbouring intermediate post 11b, and any number of intermediate receiving zones 22, each defined by two neighbouring intermediate posts 11b. Only one solar panel 3 is attached to each of the two end posts 11a, while two solar panels 3 are attached to each of the intermediate posts 11b, which are arranged in neighbouring receiving zones 22.

The holding devices 24 assigned to the individual solar panels 3 are identical to one another. The following description of a holding device 24 therefore applies to all holding devices 24.

The holding device 24 comprises a plurality of panel mounting devices 25 formed separately from one another. The solar panel 3 is attached to each of the two support posts 11 flanking it via at least one panel mounting device 25. Preferably and in accordance with the illustrated embodiment example, the holding device 24 contains a total of four panel mounting devices 25, wherein the solar panel 3 is attached to each of the two neighbouring support posts 11 via two panel mounting devices 25 arranged at a distance from one another in the post longitudinal direction 12.

The number of panel mounting devices 25 connecting a solar panel 3 to each of the neighbouring support posts 11 is based in particular on the size of the panel surface area of the solar panel 3. In principle, there can also be only a single panel mounting device 25 per support post 11, just as there can be more than two panel mounting devices 25 for connection to each support post 11, particularly in the case of particularly long solar panels 3.

Each panel mounting device 25 effects a point-by-point fastening of the solar panel 3 to a support post 11. Accordingly, a four-point fastening is present as an example. The fastening points defined by the panel mounting devices 25 are located in particular in the corners of a rectangle.

Preferably, the panel mounting devices 25 associated with the two support posts 11 of the support post pair 23 are arranged in pairs at the same height with respect to the post longitudinal direction 12.

Preferably, the panel mounting devices 25 associated with one and the same solar panel 3 are identical to one another. However, a mirror-image design, in particular mirror-symmetrical with respect to a symmetry plane 26, which extends between the two support posts 11 belonging to the same support post pair 23 orthogonally to the post row direction 14, is expedient. This is the case in the illustrated embodiment example.

Each solar panel 3 has two opposing lateral margin sections 29a, 29b, each facing one of the two support posts 11 carrying it and orientated in the post row direction 14. An elongated air slot 32 extends between each lateral margin section 29a, 29b and the neighbouring support post 11. The panel mounting devices 25 are each attached to one of the lateral margin sections 29a, 29b on the one hand and to the neighbouring support post 11 on the other hand, bridging the elongated air slot 32 located therebetween.

Expediently, the solar panels 3 are not attached to their upper margin section pointing in the post longitudinal direction 12 and the opposite lower margin section. Accordingly, unhindered solar irradiation of the photoelectrically active panel surface areas 4a, 4b is possible.

Each panel mounting device 25 has a multi-part structure, comprising a base element 27 and a separate panel support element 28. These two elements 27, 28 are preferably the only components of the panel mounting device 25, so that it is preferably constructed in two parts. In the ready-to-use operating state of the solar system 1, each panel mounting device 25 is in an assembled use configuration, in which the base element 27 and the separate panel support element 28 in this respect are attached to one another, while at the same time the base element 27 is attached to the associated support post 11 and the panel support element 28 is attached to the solar panel 3 to be held.

For the aforementioned fastening measures, a first fastening device 33 used to fasten the base element 27 to the neighbouring support post 11, a second fastening device 34 used to fasten the panel support element 28 to the base element 27 and a third fastening device 35 used to fasten the panel support element 28 to the associated solar panel 3 are provided on each panel mounting device 25. All three fastening devices 33, 34, 35 are preferably of a detachable design, so that the components of the mounting device 2 fastened to each other by them can also be separated from each other again at any time.

The installation of the support posts 11 in the soil or other ground 13 is just as subject to tolerances as the manufacture of the individual components of the solar system 1. The mounting device 2 offers the advantageous possibility of individually aligning each solar panel 3 in the desired panel in-use position regardless of the existing assembly and manufacturing tolerances. This is due to the fact that for all panel mounting devices 25 holding a panel element 7, both the base element 27 can be adjusted relative to the support post 11 assigned to it and the panel support element 28 can be adjusted relative to the base element 27 assigned to it. During assembly of the solar system 1, it is therefore possible to adjust both the base elements 27 relative to the support posts 11 and the panel support elements 28 relative to the base elements 27.

The relative position set between a base element 27 and a support post 11 can be fixed immovably by the associated first fastening device 33. The relative position set between the panel support element 28 and the base element 27 can be fixed immovably by the associated second fastening device 34.

Expediently, but not necessarily, it is also possible to align the individual panel support elements 28 with respect to the associated solar panel 3, whereby the set relative position can be fixed here by the associated third fastening device 35.

Figures 7, 8:
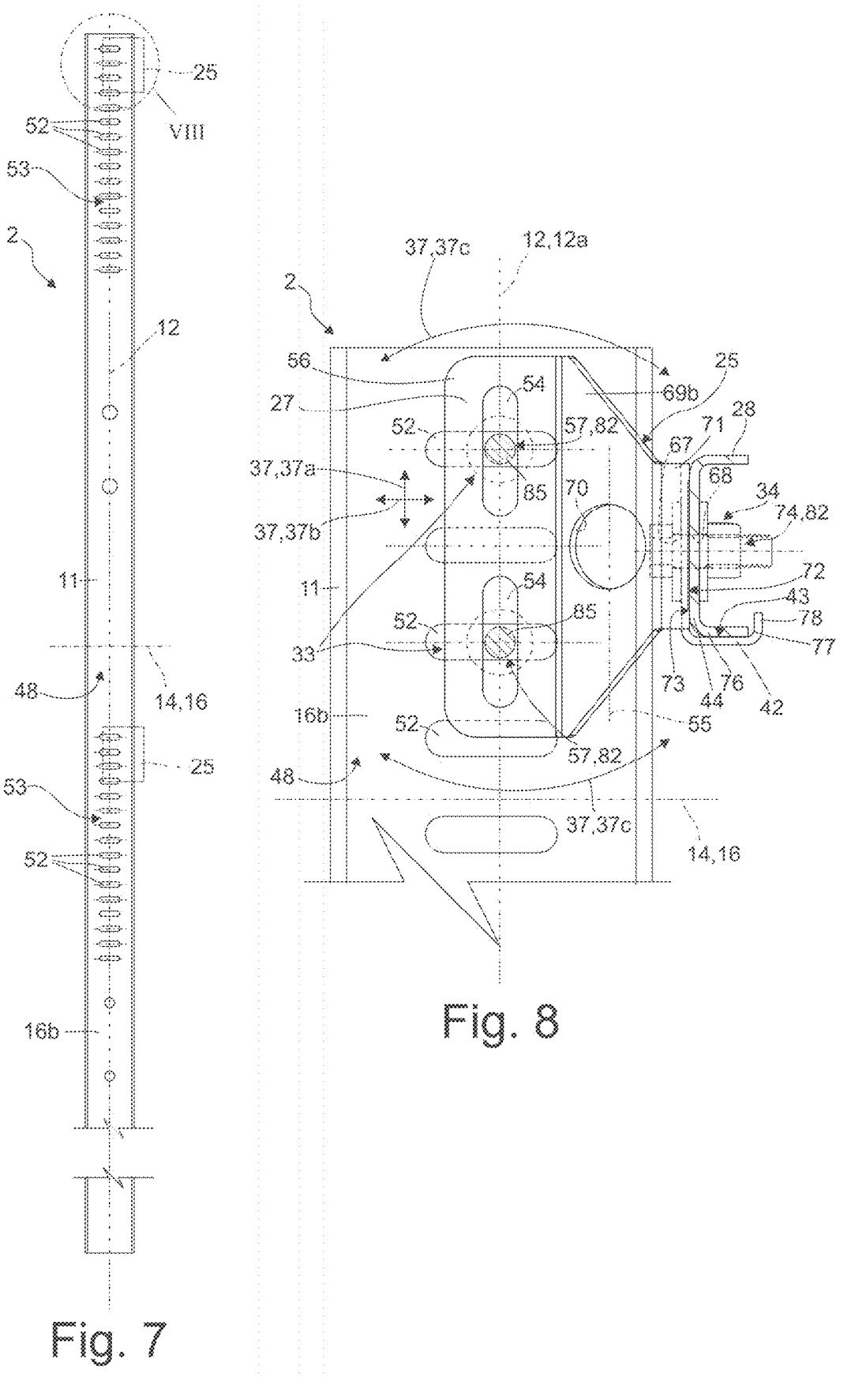
Figure 9:
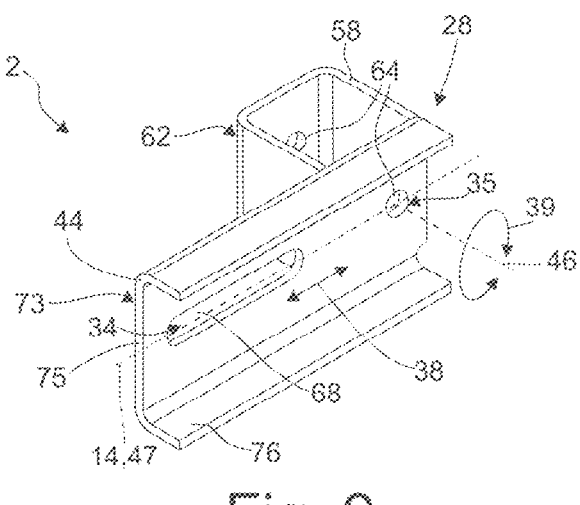

The available adjustment options expediently allow each base element 27 to be adjusted relative to the associated support post 11 in an adjustment plane 36 orthogonal to the post width direction 15 and thus also to the post row direction 14. In FIG. 8, the adjustment plane 36 extends parallel to the drawing plane. An adjustment movement which can be carried out in particular by displacement is possible transversely to the post row direction 14 in any direction, whereby in particular also superimposed adjustment movements can be carried out and in particular also rotating movements about an imaginary axis of rotation parallel to the post row direction 14.

In FIG. 8, possible adjustment movements 37 of the base element 27 are illustrated by double arrows. These adjustment movements 37 preferably include a vertical adjustment movement 37a, which can be executed to set a vertical position, a horizontal adjustment movement 37b, which can be executed to set a horizontal position, and a rotating adjustment movement 37c, which can be executed to set the inclination. Expediently, the adjustment movements 37, 37a, 37b, 37c can also be superimposed during assembly.

The available adjustment options of each panel mounting device 25 expediently further comprise an adjustability of the panel support element 28 relative to the associated base element 27 in the post row direction 14. A linear adjustment movement 38 of the panel support element 28 that can be executed in this case is indicated by a double arrow and is orientated with respect to the associated support post 11 in its post width direction 15.

Expediently, each base element 27 comprises a support section 42, which defines a flat support surface area 43, which points vertically upwards when the base element 27 is mounted on the support post 11 and on which the associated panel support element 28 rests from above with a rest section 44. The interaction between the support surface area 43 and the rest section 44 results in a linear guide for the panel support element 28. During the linear adjustment movement 38, the panel support element 28 is horizontally displaceable with its rest section 44 along the flat support surface area 43. In this respect, the panel support element 28 can in particular also be described as a slider.

Expediently, there is a further adjustment option in that each panel support element 28 can be rotated with respect to the solar panel 3 arranged on it in a rotating plane 45 parallel to the panel plane 5 as part of a rotational adjustment movement 39 indicated by a double arrow. The axis of rotation 46 for the rotational adjustment movement 39, which can also be described as a swivelling movement, runs orthogonally to the panel plane 5.

Each panel support element 28 has a longitudinal shape with a dash-dotted longitudinal axis 47 and, in the ready-to-use operating state of the solar system 1, is ideally aligned such that the longitudinal axis 47 extends in the post row direction 14. In this case, the rest section 44 protrudes laterally from the solar panel 3 in the post row direction 14 and projects in the direction of the neighbouring support post 11. The desired angular alignment can be easily set as part of the rotational adjustment movement 39.

It is easily possible to provide positioning means that allow the panel support elements 28 to be mounted on the solar panel 3 only in a predetermined position, so that the aforementioned angular alignment of the panel support elements 28 is inevitable and adjustment options can be dispensed with.

For attachment of the base elements 27, each support post 11 has two mounting surfaces 48, each formed by the outer surface of one of the post legs 16a, 16b. Mutually facing mounting surfaces 48 of two respectively neighbouring support posts 11 define one of the receiving zones 22. Each panel mounting device 25 attached to a solar panel 3 rests against the associated mounting surface 48 with a counter mounting surface 49 formed on its base element 27.

For each base element 27 to be fastened, the first fastening device 33 includes a plurality of oblong holes 52, designated as post oblong holes 52 for better differentiation, which pass through the post leg 16a, 16b associated with the panel mounting device 25. Each post oblong hole 52 thus opens out on the one hand towards one of the mounting surface areas 48 and on the other hand towards the post interior space 17. The longitudinal direction of the post oblong holes 52 courses in the post depth direction 16 and thus at least substantially horizontally orthogonal to the post row direction 14 when the solar system 1 is installed.

As an example, one oblong hole array 53 is formed in each post leg 16a, 16b for each panel mounting device 25 to be mounted, each oblong hole array 53 being composed of more than two mutually parallel post oblong holes 52 which are distributed equidistantly in the post longitudinal direction 12. By way of example, each oblong hole array 53 comprises a total of sixteen post oblong holes 52. In accordance with the exemplary number of two panel mounting devices 25 to be mounted or mounted on each post leg 16a, 16b, each post leg 16a, 16b is provided here with two oblong hole arrays 53, the spacing between which is greater than the hole spacing between the post oblong holes 52 within a respective oblong hole array 53.

Each first fastening device 33 also includes two oblong holes 54, referred to as base oblong holes 54 for better differentiation, which are formed in each base element 27. Each base element 27 has a vertical axis 55 which, when the panel mounting device 25 is mounted, has an at least substantially vertical extension and, depending on the inclination setting of the base element 27, runs parallel to the post longitudinal direction 12 or is slightly inclined in this respect. The two base oblong holes 54 are spaced apart from one another in the axial direction of the vertical axis 55, with their longitudinal axes running parallel to the vertical axis 55 and in particular coinciding. When the base element 27 is mounted on the support post 11, the base oblong holes 54 extend in the post longitudinal direction 12.

Expediently, each base element 27 has a flat base section 56 which has the counter mounting surface area 49 and through which the two base oblong holes 54 pass.

Each base element 27 is positioned on the associated post leg 16a, 16b such that each base oblong hole 54 is arranged in a configuration that crosses one of the post oblong holes 52 and is therefore referred to as a cross-over configuration. There are therefore two such cross-over configurations per base element 27, each comprising a base oblong hole 54 and a post oblong hole 52. This can be seen in particular in FIG. 8.

Each first fastening device 33 has two clamping units 57, each of which passes through one of the pairs of holes arranged in a cross-over configuration consisting of a base oblong hole 54 and a post oblong hole 52. These two clamping units 57 of the first fastening device 33 will also be referred to below as first clamping units 57 for better differentiation.

Both first clamping units 57 can be placed in a clamped state of use, in which they clamp the base section 56 of the base element 27 to the neighbouring post leg 16a, 16b and in this way clamp the base element 27 immovably to the associated support post 11. In the ready-for-use operating state of the solar system 1, the two first clamping units 57 are in the clamped state of use.

In order to be able to carry out the aforementioned alignment of the base element 27 with respect to the associated support post 11, the first clamping units 57 can be temporarily placed in an unclamped state of use, so that the base element 27 is held on the associated support post 11, but the adjustment movements 37 can be carried out in this respect.

The expediently existing plurality of post oblong holes 52 offers the advantageous possibility of optionally arranging the base oblong holes 54 of the associated base element 27 with different pairs of post oblong holes 52 in a cross-over configuration, in order to alternatively mount the base element 27 at different height levels on the support post 11. This increases the variability in setting the mounting height of the solar panels 3 above the ground 13.

The existing plurality of post oblong holes 52 does not necessarily have to be divided into several oblong hole arrays 53. For example, all the post oblong holes 52 arranged on one and the same mounting surface area 48 can be at the same distance from one another in the post longitudinal direction 12, so that there is virtually only a single oblong hole array 53, with the two base elements 27 being fastened to the support post 11 with the use of different post oblong holes 52 of the single oblong hole array 53.

The panel support element 28 mounted as intended rests with a counter mounting surface area 62 formed on it against a mounting surface area 61 of the solar panel 3 to be held. The mounting surface area 61 of the solar panel 3 is preferably located on the panel frame 6. The counter mounting surface area 62 of the panel support element 28 is preferably formed on a base section 58 of the panel support element 28, from which the rest section 54 projects transversely, ending freely in the manner of an arm.

The third fastening device 35 includes a fastening hole passing through the solar panel 3 and therefore referred to as the solar panel mounting hole 63, and further includes a fastening hole aligned therewith and passing through the base section 58 of the panel support element 28 and therefore referred to as the support element mounting hole 64. The solar panel mounting hole 63 extends orthogonally to the two flat panel surface areas 4a, 4b and is preferably formed in the panel frame 6. As an example, the solar panel mounting hole 63 passes through a first U-shaped leg 65 of the two U-shaped legs of the panel frame 6 profiled in a U-shape as mentioned above, this first U-shaped leg 65 also having the mounting surface area 61 of the solar panel 3.

The third fastening device 35 has a further clamping unit 66, designated as the third clamping unit 66 for better differentiation, which passes through the two aligned fastening holes 63, 64 and, in a clamped state of use, clamps the solar panel 3 and the panel support element 28 together in a manner that is immovable relative to one another. In particular, the panel support element 28 is orientated such that its longitudinal axis 47 extends in the post row direction 14 and the rest section 44 projects away from the solar panel 3 in the same direction.

Preferably, the third clamping unit 66 can be set to an unclamped state of use, in which it holds the panel support element 28 on the solar panel 3, but in this respect enables the above-mentioned rotational adjustment movement 39 of the panel support element 28. The axis of rotation 46 courses coaxially with the longitudinal axes of the aligned fastening holes 63, 64, which are preferably each a circular hole.

The second fastening device 34 formed for the mutual fastening of a respective panel support element 28 and a respective base element 27 includes a fastening hole formed in the base element 27, which is designated as base element mounting hole 67 for better differentiation, and an oblong hole 68 formed in the panel support element 28, which is designated as panel support element oblong hole 68. The base mounting hole 67 is expediently formed as a circular hole.

The base element 27 has a mounting section 71 which in particular adjoins the base section 56 in one piece. This mounting section 71 has a mounting surface 72 and is penetrated by the base element mounting hole 67 opening out to the mounting surface 72. The mounting surface 72 of the mounting section 71 courses orthogonally to the counter mounting surface area 49 formed on the base section 56 and in particular faces the back 19 of the mounting device 2, which also applies to the mounting surface 61 of the solar panel 3. In particular, the mounting surface area 72 of the mounting section 71 is orientated orthogonally to the post depth direction 16.

As an example, the mounting section 71 has the shape of a triangular hollow profile with three profile side walls arranged at an angle to one another corresponding to a right-angled triangle, with the base element mounting hole 67 passing through only a first profile side wall 69a of these three profile side walls. The outer surface of the first profile side wall 69a forms the mounting surface area 72 of the mounting section 71.

The mounting section 71 of the base element 27 mounted on the support post 11 expediently protrudes in the post depth direction 16 over the associated support post 11, for example in the area of the back 19.

The panel support element oblong hole 68 is expediently located in the rest section 44 of the panel support element 28, with its longitudinal direction running in the axial direction of the longitudinal axis 47 of the panel support element 28. Preferably, the panel support element oblong hole 68 is located in the centre of the cross-section on the longitudinal axis 47 of the panel support element 28.

A counter mounting surface area 73 is expediently formed on the rest section 44, with which the panel support element 28 abuts against the mounting surface area 72 of the mounting section 71 when attached to the base element 27. The panel support element oblong hole 68 is open towards the counter mounting surface area 73 and extends in alignment beyond the base element mounting hole 67.

Another clamping unit 74, referred to as the second clamping unit 74, is provided on the second fastening device 34, which jointly passes through the panel support element oblong hole 68 and the base fastening hole 67 aligned therewith.

The second clamping unit 74 can occupy a clamped state of use, in which it braces the mounting section 71 with the rest section 74 and thereby immovably fixes the panel support element 28 and the base element 27 relative to one another. In addition, the second clamping unit 74 can be brought into an unclamped state of use by appropriate actuation, in which it continues to hold the panel support element 28 and the base element 27 together, but at the same time enables the linear displacement movement 38 between the aforementioned components.

A second profile side wall 69 of the mounting section 71 opposite the first profile side wall 69a has a perforation 70 through which the second clamping unit 74 is easily accessible for its attachment and actuation.

Preferably, the rest section 44 of the panel support element 28 has a U-shaped profile and has two U-shaped legs connected to each other by a bar section 75. The counter mounting surface area 73 is located on the back of the bar section 75 facing away from the two U-shaped legs. One of the two U-shaped legs forms a rest leg 76, which can rest or rests on the support surface area 43 of the base element 27 with its outer surface facing away from the other U-shaped leg.

The support section 42 is moulded in one piece to the mounting section 71. In particular, it is profiled in such a way that it defines a vertically upwardly open support flute 77, the flute surface of which forms the support surface area 43. For example, the support section 42 is profiled in a U-shape with a U-opening pointing vertically upwards. The support flute 77 results, among other things, from the fact that the support section 42 has an upwardly pointing leg section 78 located in front of the mounting section 71 in the post depth direction 16.

The base section 58 of the panel support element 28 is expediently designed with a rectangular cross-section as a closed hollow profile. The support element mounting hole 64 is composed of two holes that are spaced apart and aligned with one another, which are formed in two opposing wall sections of the base section 58.

When the panel mounting device 25 is mounted, the longitudinal axis 47 of the panel support element 28 expediently extends past the back of the support post 11 at a distance from it. The solar panels 3, on the other hand, preferably are positioned in a plane with the support posts 11. The resulting transverse offset will be bridged by the base section 58, whose hollow profiling ensures a high degree of rigidity.

Both the base element 27 and the panel support element 28 are made of metal and are preferably inexpensively formed as bent parts. For example, they can be stamped-bent parts in which the individual perforations were made by stamping before or during the bending process. However, other manufacturing methods for the perforations are also possible.

The panel support element 28 resting with the rest section 44 on the support surface area 43 comes to rest within the support flute 77, whereby it is flanked at the front by the mounting section 71 and at the back by the projecting leg section 78 of the support section 42. In this way, the panel support element 28 is positively supported by the base element 27 in a horizontal direction orthogonal to the post row direction 14 when the second clamping unit 74 is not yet attached.

Figure 10:
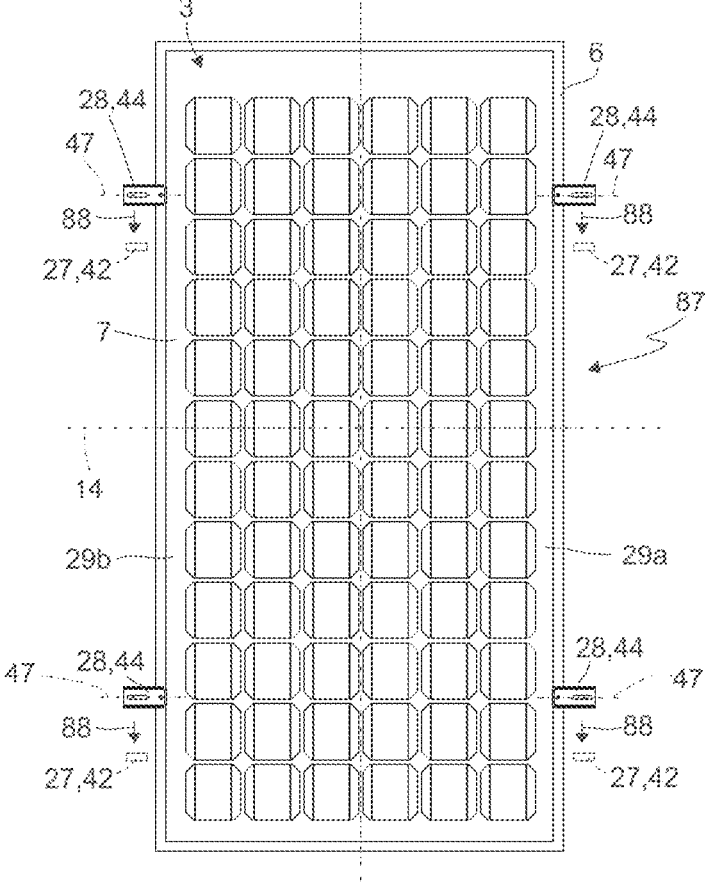

This results in the advantageous possibility of pre-mounting the panel support elements 28 on the solar panels 3 in a state separate from the base elements 27 during assembly of the solar system 1, so that a panel mounting unit 87 consisting of a solar panel 3 and the panel support elements 28 attached thereto is formed, as shown in FIG. 10. This panel mounting unit 87 can then be suspended with the support sections 42 of all its panel support elements 28 in the support sections 42 of the base elements 27, which were previously mounted on the support posts 11 in a state separate from the panel support elements 28.

Expediently, all clamping units 57, 74, 66 are each designed as a clamping screw unit 82. Each clamping screw unit 82 contains a clamping screw 83 with screw head 84 and threaded shank 85 as well as a clamping nut 86 which can be screwed or screwed onto the threaded shank 85. Each associated pair of post oblong holes 52 and base element oblong holes 74, of base mounting holes 67 and panel support oblong holes 68 and of solar panel mounting holes 63 and panel support element mounting holes 64 is penetrated by the threaded shank 85 of a clamping screw 83, whereby the two components to be clamped together are acted upon by the screw head 84 on the one hand and by the clamping nut 86 on the other. If required, washers can be placed underneath on one and/or both sides.

In the following, a preferred method is explained by which the solar system 1 also described can be mounted or installed using the mounting device 2 described.

Firstly, a sufficient number of solar panels 3, support posts 11, panel mounting devices 25 and the necessary components of the fastening devices 33, 34, 35 are provided.

Before or after this, orientation points are defined on the ground in the open area intended for the construction of the solar system 1, at which the necessary support posts 11 are to be installed for the installation of one or more rows of solar panels.

Subsequently, a plurality of support posts 11 are installed using the defined orientation points, so that at least one row of support posts 11 is formed with support posts 11 spaced apart from one another in the post row direction 14. The support posts 11 are fixed to or in the ground 13 in a suitable manner, preferably by ramming them into the ground using a suitable ramming device. The ramming is carried out to a predetermined ramming depth in each case, so that all support posts 11 project vertically upwards over the ground 13 by at least substantially the same length. The support posts 11 will be installed with the same angular position, so that, as an example, the post cross-bars 16*c* face the front 18 and the post openings 16*d* face the back 19.

As far as possible, the support posts 11 are erected in vertical alignment with the same projection relative to the ground 13, whereby, as mentioned, certain tolerances in the ramming depth and the post inclination cannot be avoided.

Neighbouring support posts 11 in the post row direction 14 each form a support post pair 23, which defines a receiving zone 22 for a solar panel 3 to be mounted in a panel in-use position.

In a next step, the base elements 27 of the panel mounting devices 25 are mounted to the support posts 11 in the desired height position in a state separate from the respective associated panel support element 28. The associated first fastening device 33 with its first clamping units 57 is used for each base element 27.

When mounting the base elements 27, the first clamping units 57 are first mounted in a still unclamped state of use, whereupon the desired alignment of the individual base elements 27 is set by means of suitable measuring devices and then the first clamping units 57 are brought into their clamped state of use by renewed actuation. In the case of the preferred use of clamping screw units 82, the clamping screws will be tightened to a previously defined torque for this purpose by means of a suitable screwing device.

During the alignment of the base element 27, the various adjustment movements 37 can be caused manually in a manner that appears suitable.

In a further step, which can be carried out before or after the above-described assembly of the base elements 27, the panel support elements 28 are attached to the solar panels 3 in a state that is still separate from the respective base element 27. This is done by way of example at the solar panel mounting holes 63, of which each solar panel 3 has at least a number corresponding to the number of panel mounting devices 25. The solar panel mounting holes 63 are located, by way of example, in the panel frames 6, but can also be provided elsewhere on the solar panel 3 in the case of frameless solar panels 3.

The panel support elements 28 will be attached to the solar panel 3 using a third fastening device 35. Preferably, rotational alignment is performed by executing the rotational adjustment movement 39 in a state of the third clamping unit

66 that has not yet been tightened, which will only be set to the tensioned state of use when the desired alignment has been set. Special alignment measures can be dispensed with if the fastening interfaces of the solar panels 3 and the panel support elements 28, which are equipped with the solar panel mounting holes 63 and the support element mounting holes 64, are designed in such a way that the two components can only be attached to one another with their mounting surface 61 and counter mounting surface 62 in a very specific target alignment.

When all the panel support elements 28 required for mounting a solar panel 3 are firmly mounted on the solar panel 3 in question, the panel mounting unit 87 already mentioned above and illustrated in FIG. 10 is present, which combines the solar panel 3 and the panel support elements 28 fixed thereto.

In each panel mounting unit 87, the rest sections 44 of the panel support elements 28 protrude away from the opposite lateral margin sections 29*a*, 29*b* of the solar panel 3 parallel to the panel plane 5 in opposite directions.

In a subsequent step of the process, the pre-assembled panel mounting unit 87 with its panel support elements 28 is attached to the base elements 27 pre-assembled on the support posts 11 using a second fastening device 34 in each case, which is indicated in FIG. 10 by arrows 88.

As long as the second clamping units 74 are not yet tightened, the solar panel 3 can be aligned with respect to the associated support post pair 23 in the post longitudinal direction 12, in particular with respect to the centre of the distance, by moving the panel mounting unit 87 in the post row direction 14 relative to the base elements 27. In doing so, the panel support elements 28 perform their linear adjustment movement 38 uniformly. Once the desired placement has been set, the panel support element 28 is fixed immovably to the base element 27 by tightening the second clamping unit 74 for each panel mounting device 25.

If necessary, the relative position of one or more base elements 27 in relation to the assigned support post 11 can be readjusted in individual cases. For this purpose, the first clamping units 57 are slightly loosened and tightened again after the alignment has been corrected.

With the mounting device 2 of the illustrated embodiment example, there is the advantageous possibility of suspending the panel mounting unit 87 with the rest sections 44 of the panel support elements 28 according to the arrows 88 in the fluted contoured support sections 42 of the base elements 27 and, in the suspended state, placing it in the desired panel in-use position by horizontal displacement before the second clamping units 74 are attached. The panel mounting unit 87 can be inserted into the base elements 27 from above in accordance with the arrows 88, whereupon the panel mounting unit 87 is securely pre-fixed even without the second clamping units 74 installed, even in windy weather conditions, due to the positive interaction between the panel support elements 28 and the base elements 27 and can no longer fall down. The second clamping units 74 will then be attached and tightened.

The invention claimed is:

1. A mounting device for a solar system, comprising:
   a plurality of support posts each extending in a post longitudinal direction, which support posts are arranged at a distance from one another with the post longitudinal direction in each case aligned at least substantially vertically in a post row direction orthogonal to the post longitudinal direction,
   wherein at least two support posts neighboring one another in the post row direction form a support post pair that laterally define a receiving zone for at least one panel-shaped solar panel which can be fastened to the two support posts of the support post pair by a holding device,
   wherein the holding device has a plurality of panel mounting devices which are formed separately from one another,
   wherein the at least one solar panel is attached to each of the two support posts of the associated support post pair via at least one of the plurality of panel mounting devices,
   wherein each panel mounting device has a base element which can be fastened to the support post and a panel support element which is separate from the base element and can be fastened to the solar panel and to the base element,
   wherein, for each panel mounting device, the base element can be adjusted relative to the support post and the panel support element can be adjusted relative to the base element, and
   wherein, the base element of each panel mounting device is adjustable relative to the associated support post in an adjustment plane orthogonal to the post row direction and each panel support element is adjustable relative to the associated base element in the post row direction, wherein the base element can be displaced in all directions in the adjustment plane in order to change its vertical position and its horizontal position orthogonal thereto relative to the associated support post and can also be rotated in the adjustment plane in order to change its inclination.

2. The mounting device according to claim 1, wherein the at least one panel-shaped solar panel is a photovoltaic module.

3. The mounting device according to claim 1, wherein the at least one panel-shaped solar panel can be positioned such that at least one flat panel surface area of the solar panel which is receptive to solar energy input extends vertically.

4. The mounting device according to claim 1, wherein the at least one solar panel has two opposing lateral margin sections, each facing one of the two support posts of the associated support post pair in the post row direction, wherein each panel mounting device is attached to the solar panel with its panel support element in the region of one of the lateral margin sections and extends between the relevant lateral margin section and the neighboring support post, bridging an air slot present between the lateral margin section and the neighboring support post.

5. The mounting device according to claim 1, wherein the panel support element of each panel mounting device is linearly displaceable relative to the associated base element in the post row direction.

6. The mounting device according to claim 1, wherein the base element of each panel mounting device attached to a support post rests against a mounting surface area of the support post which faces the other support post of the associated support post pair in the post row direction.

7. The mounting device according to claim 1, wherein each panel mounting device comprises a first fastening device, a second fastening device and a third fastening device, the first fastening device for fastening the base element to a support post, the second fastening device for fastening the panel support element to the base element and the third fastening device for fastening the panel support element to the at least one solar panel.

8. The mounting device according to claim 7, wherein each support post extends in a post width direction which coincides with the post row direction in the post in-use position and is orthogonal to the post longitudinal direction, and in a post depth direction which is orthogonal to the post longitudinal direction and the post width direction, wherein the first fastening device comprises:

a plurality of post oblong holes formed in the associated support post at a distance from one another in the post longitudinal direction and each extending in the post depth direction, two post oblong holes formed in the base element at a distance from one another in the post longitudinal direction, the base oblong holes extending in the post longitudinal direction, and two first clamping units, wherein each of the two base oblong holes of the base element is arranged in a cross-over configuration with one of the post oblong holes and wherein each first clamping unit passes through both one of the base oblong holes and the post oblong hole arranged in this respect in a cross-over configuration, wherein each first clamping unit is displaceable both into an unclamped state enabling the base element to be displaced with respect to the support post and into a clamped state locking the base element immovably with respect to the support post, wherein at least one oblong hole array consisting of a plurality of equidistant post oblong holes having more than two post oblong holes is formed in each support post, such that the at least one panel mounting device with its base element can be fastened to the support post in different vertical positions.

9. The mounting device according to claim 8, wherein each support post has a U-shaped cross-sectional profile and two post legs which are opposite one another at a distance in the post width direction and each extending in a plane orthogonal to the post width direction, wherein a plurality of the post oblong holes are formed in each of the two post legs.

10. The mounting device according to claim 7, wherein the second fastening device comprises:

a panel support element oblong hole formed in the panel support element and extending in the post row direction, a base mounting hole formed in the base element and covered by the panel support element oblong hole, and a second clamping unit, wherein the second clamping unit passes through both the panel support element oblong hole and the base element mounting hole and is displaceable into an unclamped state enabling the panel support element to be displaced relative to the base element and into a clamped state which immovably blocks the panel support element relative to the base element.

11. The mounting device according to claim 7, wherein the third fastening device comprises a third clamping unit which passes through both a support element mounting hole, formed in the panel support element, and a solar panel mounting hole, aligned therewith, of the solar panel, wherein the third clamping unit can be set into a clamped state which fixes the solar panel immovably to the panel support element, wherein the solar panel mounting hole is formed in a panel frame which defines the solar panel on the outside all round and which is braced with the panel support element in the clamped state of the third clamping unit.

12. The mounting device according to claim 8, wherein each clamping unit is a clamping screw unit comprising at least one clamping screw.

13. The mounting device according to claim 1, wherein the base element of each panel mounting device has a support section with a vertically upwardly pointing support surface area, wherein the associated panel support element with a rest section can be placed or rests vertically from above on the support surface and can be displaced along the support surface in the post row direction to set the panel in the state resting on the support surface, wherein the support section of each panel mounting device defines an upwardly open support flute extending in the post row direction, the flute surface of which forms the support surface and into which the panel support element can be suspended or hooked by its rest section.

14. The mounting device according to claim 1, wherein the at least one solar panel is attached to each of the two support posts of the associated support post pair via two panel mounting devices arranged at a distance from one another in the post longitudinal direction.

15. The mounting device according to claim 1, comprising more than two support posts arranged at a distance from one another in the post row direction which each define a receiving zone for at least one solar panel, wherein each support post forms one of two support post pairs each defining its own receiving zone for a solar panel, wherein at least one solar panel is mounted on each of two support post pairs arranged adjacent to one another in the post row direction, at least one separate panel mounting device for each solar panel being attachable to a support post belonging simultaneously to both support post pairs.

16. The mounting device according to claim 1, wherein, for each panel mounting device, the base element and/or the panel support element is formed as a one-piece bent part consisting of metal.

17. A method for mounting a solar system by means of a mounting device for a solar system, the mounting device comprising:

a plurality of support posts each extending in a post longitudinal direction, which support posts are arranged at a distance from one another with the post longitudinal direction in each case aligned at least substantially vertically in a post row direction orthogonal to the post longitudinal direction, wherein at least two support posts neighboring one another in the post row direction form a support post pair that laterally define a receiving zone for at least one panel-shaped solar panel which can be fastened to the two support posts of the support post pair by a holding device, wherein the holding device has a plurality of panel mounting devices which are formed separately from one another, wherein the at least one solar panel is attached to each of the two support posts of the associated support post pair via at least one of the plurality of panel mounting devices, wherein each panel mounting device has a base element which can be fastened to the support post and a panel support element which is separate from the base element and can be fastened to the solar panel and to the base element, wherein, for each panel mounting device, the base element can be adjusted relative to the support post and the panel support element can be adjusted relative to the base element, and wherein, the base element of each panel mounting device is adjustable relative to the associated support post in an adjustment plane orthogonal to the post row direction and each panel support element is adjustable relative to the associated base element in the post row direction, wherein the base element can be displaced in all directions in the adjustment plane in order to change its vertical position and its horizontal position orthogonal thereto relative to the associated support post and can also be rotated in the adjustment plane in order to change its inclination, the method comprising:

installing a plurality of support posts on or in a ground such that the support posts are arranged at a distance from one another in a post row direction and their post longitudinal direction is at least substantially vertical in each case, so that neighboring support posts in the post row direction each form a support post pair which defines a receiving zone for a solar panel, attaching the base elements of the panel mounting devices used to hold at least one solar panel to the two support posts of at least one of the installed support post pairs in a state separate from the respective associated panel support element, attaching the panel support elements of the panel mounting devices used to hold a solar panel in a state separate from the respective base element to at least one solar panel to be mounted on a support post pair, forming a panel mounting unit, attaching the panel mounting unit with its panel support elements to the base elements previously attached to a support post pair, and setting the desired panel in-use position for the solar panel by aligning the individual base elements with respect to the support posts fitted with them before and/or after attachment of the panel mounting unit and by aligning the panel support elements attached to the solar panel with respect to the base element assigned to them in each case.

18. The method according to claim 17, wherein the individual base elements are aligned independently of one another with respect to the support posts fitted with them and wherein the panel support elements are uniformly aligned with respect to the base elements of all associated panel mounting devices by changing the position of the panel mounting unit.

19. The method according to claim 17, wherein the panel mounting unit for attachment to the base elements attached to the support posts is hooked with all its module holding elements simultaneously into the associated base elements.

20. A mounting device for a solar system, comprising:

a plurality of support posts each extending in a post longitudinal direction, which support posts are arranged at a distance from one another with the post longitudinal direction in each case aligned at least substantially vertically in a post row direction orthogonal to the post longitudinal direction, wherein at least two support posts neighboring one another in the post row direction form a support post pair that laterally define a receiving zone for at least one panel-shaped solar panel which can be fastened to the two support posts of the support post pair by a holding device, wherein the holding device has a plurality of panel mounting devices which are formed separately from one another, wherein the at least one solar panel is attached to each of the two support posts of the associated support post pair via at least one of the plurality of panel mounting devices, wherein each panel mounting device has a base element which can be fastened to the support post and a panel support element which is separate from the base element and can be fastened to the solar panel and to the base element, wherein, for each panel mounting device, the base element can be adjusted relative to the support post and the panel support element can be adjusted relative to the base element, and wherein the base element of each panel mounting device has a support section with a vertically upwardly pointing support surface area, wherein the associated panel support element with a rest section can be placed or rests vertically from above on the support surface and can be displaced along the support surface in the post row direction to set the panel in the state resting on the support surface, and wherein the support section of each panel mounting device defines an upwardly open support flute extending in the post row direction, the flute surface of which forms the support surface and into which the panel support element can be suspended or hooked by its rest section.

21. A method for mounting a solar system by means of a mounting device for a solar system, the mounting device comprising:

a plurality of support posts each extending in a post longitudinal direction, which support posts are arranged at a distance from one another with the post longitudinal direction in each case aligned at least substantially vertically in a post row direction orthogonal to the post longitudinal direction, wherein at least two support posts neighboring one another in the post row direction form a support post pair that laterally define a receiving zone for at least one panel-shaped solar panel which can be fastened to the two support posts of the support post pair by a holding device, wherein the holding device has a plurality of panel mounting devices which are formed separately from one another, wherein the at least one solar panel is attached to each of the two support posts of the associated support post pair via at least one of the plurality of panel mounting devices, wherein each panel mounting device has a base element which can be fastened to the support post and a panel support element which is separate from the base element and can be fastened to the solar panel and to the base element, and wherein, for each panel mounting device, the base element can be adjusted relative to the support post and the panel support element can be adjusted relative to the base element, wherein the base element of each panel mounting device has a support section with a vertically upwardly pointing support surface area, wherein the associated panel support element with a rest section can be placed or rests vertically from above on the support surface and can be displaced along the support surface in the post row direction to set the panel in the state resting on the support surface, wherein the support section of each panel mounting device defines an upwardly open support flute extending in the post row direction, the flute surface of which forms the support surface and into which the panel support element can be suspended or hooked by its rest section, the method comprising:

installing a plurality of support posts on or in a ground such that the support posts are arranged at a distance from one another in a post row direction and their post longitudinal direction is at least substantially vertical in each case, so that neighboring support posts in the post row direction each form a support post pair which defines a receiving zone for a solar panel, attaching the base elements of the panel mounting devices used to hold at least one solar panel to the two support posts of at least one of the installed support post pairs in a state separate from the respective associated panel support element, attaching the panel support elements of the panel mounting devices used to hold the solar panel in a state separate from the respective base element to at least one solar panel to be mounted on a support post pair, forming a panel mounting unit, attaching the panel mounting unit with its panel support elements to the base elements previously attached to the support post pair, and setting the desired panel in-use position for the solar panel by aligning the individual base elements with respect to the support posts fitted with them before and/or after attachment of the panel mounting unit and by aligning the panel support elements attached to the solar panel with respect to the base element assigned to them in each case.

* * * * *